US009908405B2

(12) United States Patent
Kito et al.

(10) Patent No.: US 9,908,405 B2
(45) Date of Patent: Mar. 6, 2018

(54) FUEL SUPPLY SYSTEM

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 169 days.

(21) Appl. No.: 14/722,298

(22) Filed: May 27, 2015

(65) Prior Publication Data
US 2015/0352948 A1 Dec. 10, 2015

(30) Foreign Application Priority Data

Jun. 9, 2014 (JP) .................................. 2014-118349
Apr. 1, 2015 (JP) .................................. 2015-74694

(51) Int. Cl.
*B65D 47/02* (2006.01)
*B60K 15/05* (2006.01)
*B60K 15/035* (2006.01)
*B60K 15/04* (2006.01)

(52) U.S. Cl.
CPC ............ *B60K 15/05* (2013.01); *B60K 15/035* (2013.01); *B60K 2015/03528* (2013.01); *B60K 2015/03552* (2013.01); *B60K 2015/0477* (2013.01)

(58) Field of Classification Search
CPC ............................... B60K 15/05; B60K 15/035
USPC .............................. 220/86.2, 86.1, 86.3, 86.4
See application file for complete search history.

(56) References Cited

U.S. PATENT DOCUMENTS 3,482,859 A * 12/1969 Bowlin .................. F16L 21/035
285/332.3
4,652,023 A * 3/1987 Timmons .............. F16L 55/172
138/99
7,040,669 B2 * 5/2006 Kenmotsu ............... F16K 15/03
137/515.3

FOREIGN PATENT DOCUMENTS

JP 08-296630 A 11/1996
JP 2009-274496 A 11/2009
JP 2011-131824 A 7/2011

OTHER PUBLICATIONS

Office Action dated Jun. 26, 2017 for the corresponding CN application No. 201510300708.3 (english translation).

* cited by examiner

*Primary Examiner* — Jeffrey Allen
(74) *Attorney, Agent, or Firm* — Posz Law Group, PLC

(57) ABSTRACT

A fuel supply system includes a filler neck that is provided in a filler neck body formed in a tubular shape and has a pipe connection structure. A first member is formed separately from the filler neck. A second member is formed separately from the filler neck to be different from the first member. The first member and the second member are engaged with each other. At least one of the first member and the second member includes a protective portion that is configured to cover at least part of the pipe connection structure in a state that the first member and the second member are engaged with each other and positions of the first member and the second member are fixed relative to the filler neck. This configuration suppresses damage of the pipe connection structure that is connected with the filler neck in the fuel supply system.

17 Claims, 12 Drawing Sheets

A-A CROSS SECTION

B1-B1 CROSS SECTION

VIEWED FROM ARROW C1

FUEL SUPPLY SYSTEM

CROSS-REFERENCE TO RELATED APPLICATIONS

This application claims priorities to Japanese Patent Applications No. 2015-74694 filed on Apr. 1, 2015, and No. 2014-118349 filed on Jun. 9, 2014, entire disclosures of which are incorporated herein by reference for all purposes.

TECHNICAL FIELD

The present invention relates to a fuel supply system.

DESCRIPTION OF RELATED ART

As is known in the art, a fuel supply system built in an automobile is configured to introduce a fuel such as gasoline supplied from a fuel gun to a fuel tank of the automobile. The fuel is supplied from the fuel gun to the fuel tank through the fuel supply system or more specifically a filler neck with a filler port and a filler tube provided to connect the filler neck and the fuel tank for the automobile. A breather pipe is connected with the filler neck separately from the filler tube, in order to return the fuel vapor in the fuel tank to the filler neck.

In order to suppress reduction of sealing between the filler neck and the filler tube by an external impact force applied to the automobile, a filler tube mounting structure disclosed in JP 2009-274496A includes a first protector that is made of a resin and is located in the vicinity of a filler tube and a cylindrical second protector that is made of a resin to cover the filler neck. In a fuel supply system disclosed in JP 2011-131824A, a stopper projection is formed on the outer periphery of a pipe connection structure formed for connecting the breather pipe with the filler neck, so as to prevent the breather pipe connected with the pipe connection structure from coming off.

SUMMARY

The filler neck includes a tube connection structure for connecting the filler neck with the filler tube and a pipe connection structure for connecting the filler neck with the breather pipe. The pipe connection structure is branched off from the filler neck. A stress is thus likely to be concentrated at a joint of the pipe connection structure with the breather pipe, so that the pipe connection structure of the filler neck is likely to be more readily damaged compared with the remaining part of the filler neck. The technique disclosed in JP 2009-274496A suppresses reduction of sealing between the filler neck and the filler tube but does not take into account suppression of damage of the joint of the pipe connection structure with the breather pipe. With respect to the prior art fuel supply system, other needs include downsizing, cost reduction, resource saving, easy manufacture and improvement of convenience.

In order to solve at least part of the problems described above, the invention may be implemented by the following aspects.

(1) According to one aspect of the invention, there is provided a fuel supply system. The fuel supply system may comprise a filler neck that has a filler neck body with a tubular shape and a pipe connection structure formed in the filler neck body; a first member that is formed separately from the filler neck; and a second member that is formed separately from the filler neck to be different from the first member, and the first member and the second member are engaged with each other. At least one of the first member and the second member may include a protective portion that is configured to cover at least part of the pipe connection structure in a state that the first member and the second member are engaged with each other and positions of the first member and the second member to the filler neck are fixed. In an application that the fuel supply system of this aspect is built in an automobile, even when an external impact force is applied to the automobile, the protective portion serves to suppress the external impact force from being directly applied to the pipe connection structure and thereby protects the pipe connection structure from damage.

(2) In the fuel supply system of the above aspect, the filler neck may have a fixation structure that fixes at least one of the positions of the first member and the second member to the filler neck. In the fuel supply system of this aspect, the positions of the first member and the second member to the filler neck are fixed by the fixation structure. This configuration enables the protective portion to be readily replaced even in the state that the components of the fuel supply system other than the protective portion are mounted to the automobile.

(3) In the fuel supply system of the above aspect, the protective portion may include a first protective portion included in the first member and a second protective portion included in the second member. In the state that the first member and the second member are engaged with each other and the positions of the first member and the second member are fixed to the filler neck, the first protective portion and the second protective portion may be configured to cover the pipe connection structure as curved surfaces parallel to a central axis of the filler neck body formed in the tubular shape, such that the respective curved surfaces to cover the pipe connection structure do not overlap with each other. In the fuel supply system of this aspect, the first member and the second member are easily mountable from the side face without moving along the central axis of the filler neck body even in the state that the components of the fuel supply system other than the first member and the second member are mounted to the automobile. Additionally, the first member and the second member cover the pipe connection structure at different positions. This allows for downsizing of the protective portion.

(4) In the fuel supply system of the above aspect, in the state that the first member and the second member are engaged with each other and the positions of the first member and the second member are fixed to the filler neck, the first member may be formed to cover the pipe connection structure as a curved surface parallel to the central axis of the filler neck body formed in the tubular shape. In the fuel supply system of this aspect, the pipe connection structure is covered by only the first member. This configuration needs to change the material or the like of only the first member according to the specification of the automobile which the fuel supply system is built in and the working condition of the automobile, thus improving the convenience of the fuel supply system.

(5) In the fuel supply system of the above aspect, in the state that the first member and the second member are engaged with each other and the positions of the first member and the second member are fixed to the filler neck, the first member and the second member may be configured to cover the pipe connection structure as the curved surfaces parallel to the central axis of the filler neck body and cover the pipe connection structure on a side of the filler neck receiving a supplied fuel along the central axis of the filler neck body. Even when an external impact force is applied along the central axis of the filler neck body, the fuel supply system of this aspect suppresses the impact force from being applied to the pipe connection structure.

(6) In the fuel supply system of the above aspect, the protective portion may be configured to cover the pipe connection structure as a curved surface parallel to a central axis of the pipe connection structure. In the fuel supply system of this aspect, the protective portion is located entirely at a position away from the outer circumference of the pipe connection structure by a fixed distance. Even when an external impact force is applied to the protective portion, this configuration prevents the impact force from being concentrated at part of the pipe connection structure. This more effectively protects the pipe connection structure from damage.

The invention may be implemented by any of various aspects other than the fuel supply system, for example, a vehicle equipped with the fuel supply system, a manufacturing method of the fuel supply system, an integrated circuit or a computer program configured to actualize the fuel supply system or the method, and a non-transitory storage medium in which such a computer program is stored.

In an application that the fuel supply system of the above aspect of the invention is built in an automobile, even when an external impact force is applied to the automobile, the protective portion suppresses the external impact force from being directly applied to the pipe connection structure and protects the pipe connection structure from damage. In the fuel supply system of the above aspect, the positions of the first member and the second member are fixed relative to the filler neck by the fixation structure. This configuration enables the protective portion to be readily replaced even in the state that the components of the fuel supply system other than the protective portion are mounted to the automobile.

DESCRIPTION OF EMBODIMENTS

A. First Embodiment

Figure 1:
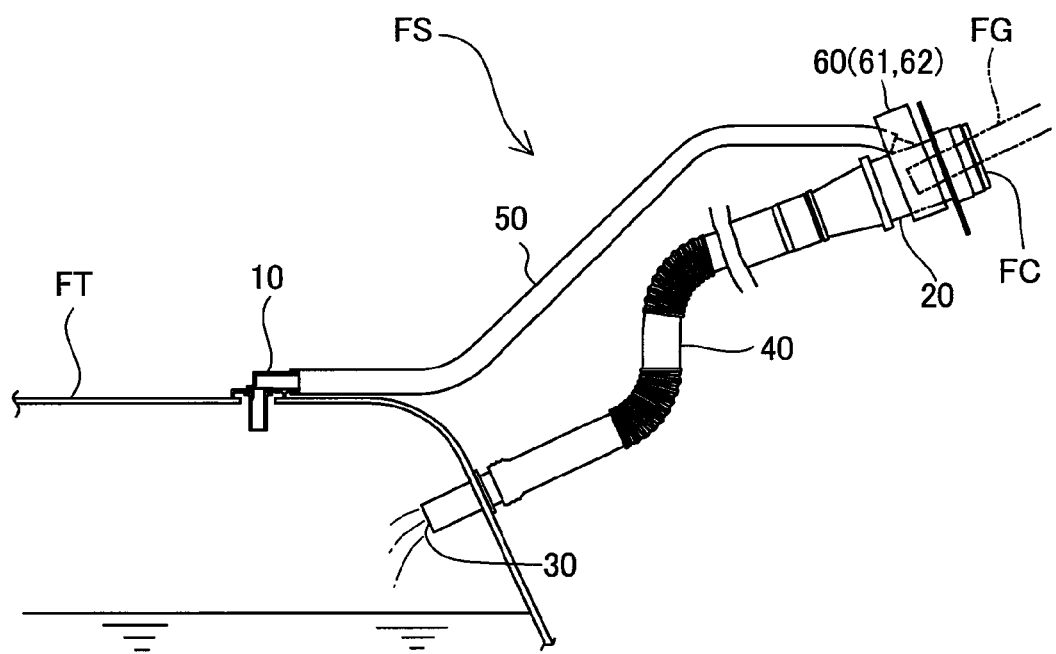
FIG. 1 is a schematic diagram illustrating a fuel supply system configured to supply a fuel to a fuel tank for an automobile.

FIG. 1 is a schematic diagram illustrating a fuel supply system FS configured to supply a fuel to a fuel tank FT for an automobile. The fuel supply system FS includes a filler neck 20, a filler tube 40, a breather pipe 50, a flow control valve 10, a protective member 60 and a check valve 30. The filler neck 20 is connected with the fuel tank FT by the filler tube 40 and the breather pipe 50. The filler tube 40 is connected with the fuel tank FT via the check valve 30. The breather pipe 50 is connected with the fuel tank FT via the flow control valve 10. The breather pipe 50 is protected by the protective member 60.

Figure 2:
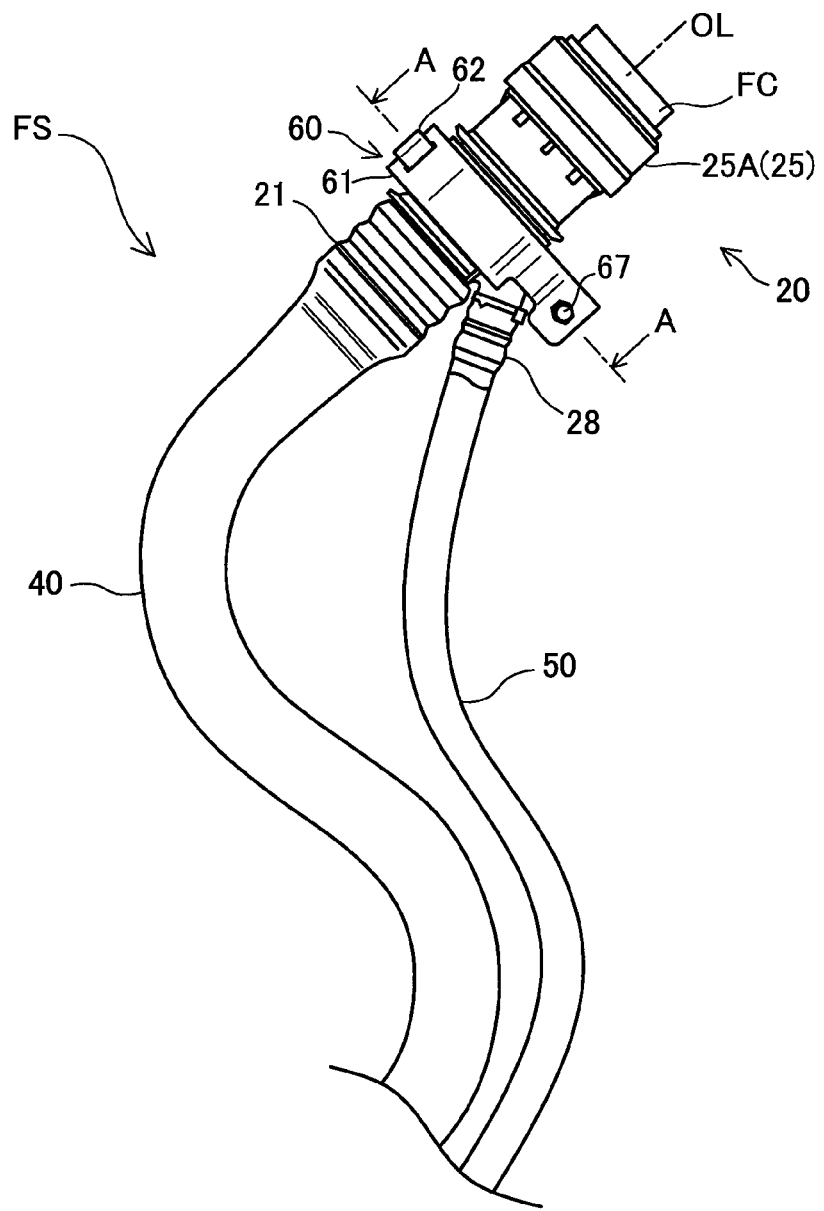
FIG. 2 is a diagram illustrating the configuration of a filler neck and a protective member in detail.
Figure 3:
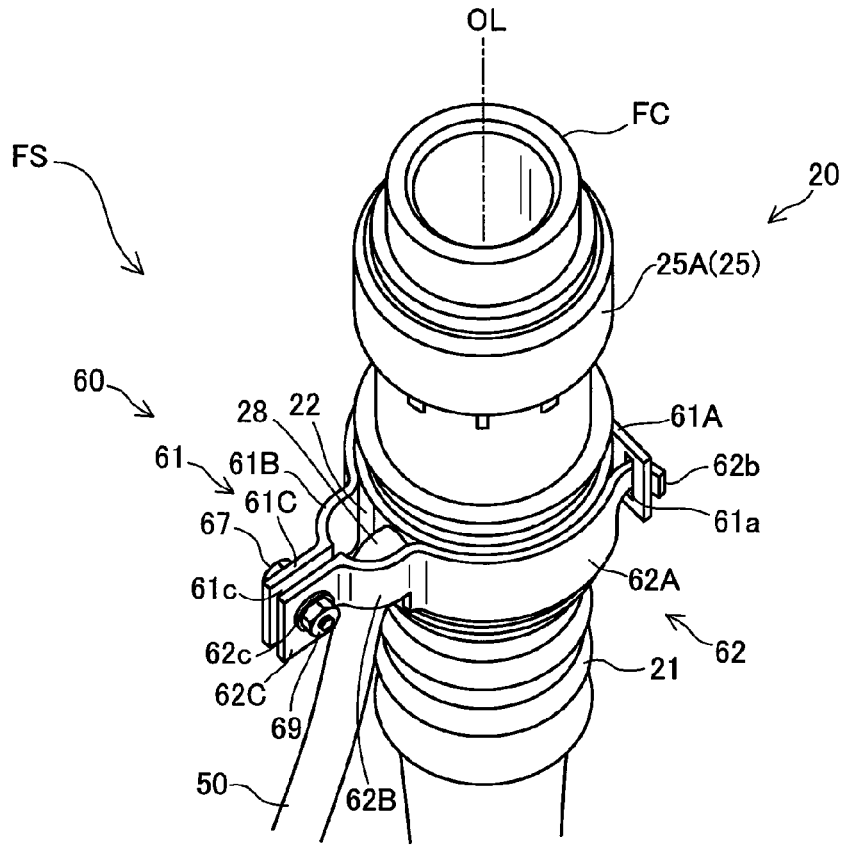
FIG. 3 is a perspective view illustrating the configuration in the periphery of the filler neck in detail.

The fuel supply system FS is described more in detail with reference to FIGS. 2 and 3. FIG. 2 is a diagram illustrating the configuration of the filler neck 20 and the protective member 60 in detail. FIG. 3 is a perspective view illustrating the configuration in the periphery of the filler neck 20 in detail. The filler neck 20 includes a filler neck body 25 and a breather port 28. The filler neck body 25 is a hollow cylindrical member made of an electrically conductive resin. The filler neck body 25 has a filler port FC formed on one end thereof and a tube connection structure 21 formed on the other end thereof for connection with the filler tube 40. The filler neck body 25 includes a large diameter portion 25A provided in the vicinity of the filler port FC and formed to have a larger diameter than the outer circumferential diameter of the filler port FC. The filler port FC receives a fuel gun FG inserted therein to supply the fuel. Steps in a corrugated shape are formed around the outer periphery of the tube connection structure 21 to enhance sealing against the filler tube 40 pressed therein.

The breather port 28 is a hollow cylindrical member branched off from the filler neck body 25 and formed to have a smaller diameter than the diameter of the filler neck body 25. The breather port 28 is connected on its base end side with the filler neck body 25 by adhesion. According to this embodiment, the base end side of the breather port 28 is welded to and connected with the filler neck body 25. The breather pipe 50 is pressed in the breather port 28 on its opposite end side. In order to enhance sealing against the breather pipe 50 pressed in the breather port, steps in a corrugated shape are formed around the outer periphery on the opposite end side of the breather port 28. The breather port 28 of this embodiment corresponds to the pipe connection structure of the claims.

The filler tube 40 is provided to communicate the filler neck 20 with the fuel tank FT that is placed inside of the automobile to store the fuel. The filler tube 40 is, for example, a resin tube having serpentine structures at two different positions to be stretchable, contractable and bendable in some range.

The flow control valve 10 is located on an upper wall of the fuel tank FT to communicate the breather pipe 50 with the fuel tank FT. The flow control valve 10 is a check valve opened and closed in response to the internal pressure of the fuel tank FT. The flow control valve 10 is closed at the internal pressure of the fuel tank FT equal to or lower than a predetermined value so as not to communicate the breather pipe 50 with the fuel tank FT, while being opened at the internal pressure of the fuel tank FT higher than the predetermined value so as to communicate the breather pipe 50 with the fuel tank FT. The flow control valve 10 is operated to maintain the internal pressure of the fuel tank FT at a predetermined pressure level and thereby suppress, for example, deformation of the fuel tank FT. The flow control valve 10 may not necessarily have the functions of the check valve but may have only the function that causes a pipe end protruded in the fuel tank FT to come into contact with the liquid surface of the fuel in the fuel tank FT and raise the internal pressure of the fuel tank FT during fueling.

The breather pipe 50 is provided to connect the filler neck 20 with the fuel tank FT via the flow control valve 10. When the fuel control valve 10 is opened to communicate the breather pipe 50 with the fuel tank FT, the fuel vapor in the fuel tank FT is introduced through the breather pipe 50 to the filler neck 20. The fuel vapor introduced to the filler neck 20 is introduced with the supplied fuel through the filler tube 40 to the fuel tank FT during fueling.

The protective member 60 is a metal fitting fixed at a position of the filler neck body 25 which the breather port 28 is connected with. The protective member 60 forms a curved surface parallel to and along the outer circumference of the filler neck body 25 about a central axis OL to cover part of the filler neck body 25 and the joint of the filler neck body 25 with the breather port 28.

As shown in FIG. 3, the protective member 60 includes a first protective structure 61, a second protective structure 62, a bolt 67 and a nut 69. The filler neck body 25 has a groove 22 formed in part of the outer peripheral surface along the outer circumference of the filler neck body 25 to have a smaller diameter than the outer circumferential diameter of the remaining part, in order to fix relative positions of the first protective structure 61 and the second protective structure 62 to the filler neck body 25. The joint of the breather port 28 with the filler neck body 25 is placed in the groove 22 of the filler neck body 25.

Figure 4:
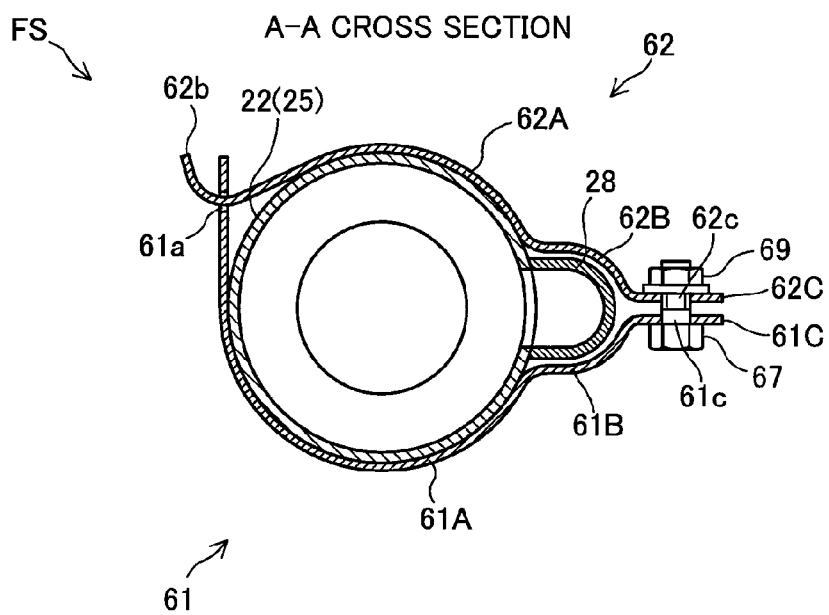
FIG. 4 is a sectional view illustrating the filler neck taken on a line A-A in FIG. 2.

The protective member 60 is described more in detail with reference to FIGS. 2 to 4. FIG. 4 is a sectional view illustrating the filler neck 20 taken on a line A-A in FIG. 2. As shown in FIGS. 3 and 4, the first protective structure 61 includes a large diameter portion 61A, a curved portion 61B continuous with the large diameter portion 61A and a flat plate portion 61C continuous with the curved portion 61B. The large diameter portion 61A of the first protective structure 61 is placed along the groove 22 of the filler neck body 25 when the protective member 60 is fixed to the filler neck 20. The large diameter portion 61A has a curved shape corresponding to the shape of the groove 22 of the filler neck body 25. The large diameter portion 61A is connected with the curved portion 61B at one end and has a claw insertion hole 61a formed at the other end to receive a claw 62b of the second protective structure 62 (described later) inserted therein. The claw insertion hole 61a is formed in the large diameter portion 61A to be placed at a position away from the groove 22 of the filler neck body 25. The large diameter portion 61A is configured to have gradually decreasing distance from the groove 22 of the filler neck body 25 in a direction from the claw insertion hole 61a toward the curved portion 61B about the central axis OL to be eventually engaged with the groove 22 of the filler neck body 25.

The curved portion 61B of the first protective structure 61 is placed away from the joint of the filler neck body 25 with the breather port 28 when the protective member 60 is fixed to the filler neck 20. The curved portion 61B has an arc-shaped surface of a diameter that is smaller than the diameter of the large diameter portion 61A but is larger than the outer circumferential diameter of the breather port 28 in the A-A cross section as shown in FIG. 4, about an axis that is parallel to the central axis OL but is different from the central axis OL.

Unlike the large diameter portion 61A and the curved portion 61B, the flat plate portion 61C has a planar shape along the central axis OL. The flat plate portion 61C has a bolt insertion hole 61c which the bolt 67 passes through, in a center area of the flat plate portion 61C.

Like the first protective structure 61, the second protective structure 62 includes a large diameter portion 62A, a curved portion 62B continuous with the large diameter portion 62A and a flat plate portion 62C continuous with the curved portion 62B. Like the large diameter portion 61A of the first protective structure 61, the large diameter portion 62A of the second protective structure 62 is placed along the groove 22 of the filler neck body 25 when the protective member 60 is fixed to the filler neck 20. The large diameter portion 62A has a curved shape corresponding to the shape of the groove 22 of the filler neck body 25. The large diameter portion 62A has a curved surface about the central axis OL of the filler neck body 25 which has the same diameter as that of the large diameter portion 61A of the first protective structure 61 but has the smaller arc than that of the large diameter portion 61A. The large diameter portion 62A has the claw 62b that is formed at the other end of the large diameter portion 62A opposite to one end continuous with the curved portion 62B to be inserted into the claw insertion hole 61a formed in the first protective structure 61. The claw 62b is formed in the large diameter portion 62A to be placed at a position away from the groove 22 of the filler neck body 25. Like the large diameter portion 61A of the first protective structure 61, the large diameter portion 62A is configured to have gradually decreasing distance from the groove 22 of the filler neck body 25 in a direction from the claw 62b toward the curved portion 62B about the central axis OL to be eventually engaged with the groove 22 of the filler neck body 25.

Like the curved portion 61B of the first protective structure 61, the curved portion 62B of the second protective structure 62 is placed away from the joint of the filler neck body 25 with the breather port 28 when the protective member 60 is fixed to the filler neck 20. The curved portion 62B has such a shape that is plane symmetrical to the curved portion 61B of the first protective structure 61 with respect to a surface parallel to the flat plate portion 61C of the first protective structure 61 when the protective member 60 is fixed to the filler neck body 25. In other words, the curved portion 61B of the first protective structure 61 and the curved portion 62B of the second protective structure 62 have such shapes that are plane symmetrical to each other with respect to a plane going through the center of the joint of the breather port 28 with the filler neck body 25 and the central axis OL. Accordingly, a curved surface that is parallel to the central axis OL and is formed by the curved portion 62B of the second protective structure 62 to cover the breather port 28 does not overlap with a curved surface that is parallel to the central axis OL and is formed by the curved portion 61B of the first protective structure 61 to cover the breather port 28.

Like the flat plate portion 61C of the first protective structure 61, the flat plate portion 62C of the second protective structure 62 is fastened by means of the bolt 67 and the nut 69 when the protective member 60 is fixed to the filler neck 20. The flat plate portion 62C has a planar shape that is plane symmetrical to the flat plate portion 61C with respect to the plane of the flat plate portion 61C of the first protective structure 61 when the protective member 60 is fixed to the filler neck body 25. Like the flat plate portion 61C of the first protective structure 61, the flat plate portion 62C has a bolt insertion hole 62c which the bolt 67 passes through, in a center area of the flat plate portion 62C. Accordingly, the flat plate portion 61C of the first protective structure 61 and the flat plate portion 62C of the second protective structure 62 have such shapes that are plane symmetrical to each other with respect to a plane going through the center of the joint of the breather port 28 with the filler neck body 25 and the central axis OL.

The claw 62b of the second protective structure 62 is inserted into the claw insertion hole 61a of the first protective structure 61, and the bolt 67 and the nut 69 are fastened in the bolt insertion hole 61c of the first protective structure 61 and the bolt insertion hole 62c of the second protective structure 62. The positions of the first protective structure 61 and the second protective structure 62 are then fixed relative to the groove 22 of the filler neck body 25. The first protective structure 61 and the second protective structure 62 of the embodiment respectively correspond to the first member and the second member of the claims. The curved portion 61B of the first protective structure 61 and the curved portion 62B of the second protective structure 62 respectively correspond to the first protective portion and the second protective portion of the claims. The groove 22 formed in the filler neck body 25 corresponds to the fixation structure of the claims. According to another embodiment, at least one of the first protective structure 61 and the second protective structure 62 may be clamped and fixed to the filler neck body 25 by means of, for example, a bolt.

As described above, in the fuel supply system FS of the embodiment, the first protective structure 61 and the second protective structure 62 are fastened to the groove 22 formed in the filler neck body 25, so that the positions of the first protective structure 61 and the second protective structure 62 are then fixed relative to the filler neck body 25. When the first protective structure 61 and the second protective structure 62 are fixed to the filler neck body 25, the first protective structure 61 and the second protective structure 62 are located at positions away from the joint of the filler neck body 25 with the breather port 28, so as to cover the joint of the filler neck body 25 with the breather port 28 as curved surfaces parallel to the central axis OL. Accordingly, in the fuel supply system FS of the embodiment built in an automobile, even when an external impact force is applied to the automobile, the protective member 60 suppresses the external impact force from being directly applied to the joint of the filler neck body 25 with the breather port 28 and thereby protects the joint from damage. In the fuel supply system FS of the embodiment, the first protective structure 61 and the second protective structure 62 are fastened to the groove 22 of the filler neck body 25 by means of the bolt 67 and the nut 69, so that the protective member 60 is readily replaceable even in the state that the fuel supply system FS other than the protective member 60 is mounted to the automobile.

In the fuel supply system FS of the embodiment, the curved portion 61B of the first protective structure 61 and the curved portion 62B of the second protective structure 62 form a cylindrical curved surface parallel to the central axis OL to cover the joint of the filler neck body 25 with the breather port 28. Accordingly, in the fuel supply system FS of the embodiment, the first protective structure 61 and the second protective structure 62 are easily mountable from the side face without moving along the central axis OL even in the state that the components of the fuel supply system FS other than the first protective structure 61 and the second protective structure 62 are mounted to the automobile. In the fuel supply system FS of the embodiment, a curved surface that is parallel to the central axis OL and is formed by the curved portion 62B of the second protective structure 62 to cover the breather port 28 does not overlap with a curved surface that is parallel to the central axis OL and is formed by the curved portion 61B of the first protective structure 61 to cover the breather port 28. Accordingly, in the fuel supply system FS of the embodiment, the first protective structure 61 and the second protective structure 62 cover the joint of the filler neck body 25 with the breather port 28 at different positions. This leads to downsizing of the protective member 60.

In the fuel supply system FS of the embodiment, the protective member 60 covers the fuel tank FT-side of the breather port 28 and thereby protects the joint of the filler neck body 25 with the breather port 28 at which the stress is concentrated, without expanding the periphery of the opening of the filler neck 20.

B. Second Embodiment

Figure 5:
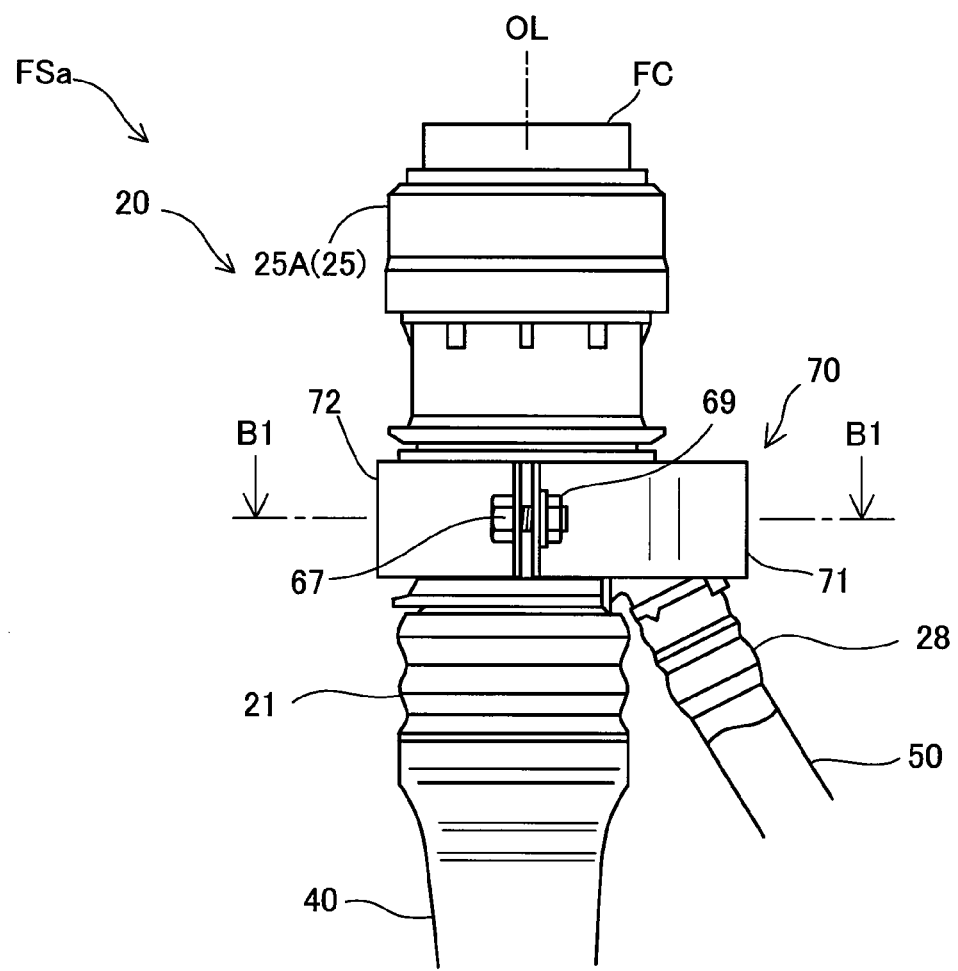
FIG. 5 is a diagram illustrating part of a fuel supply system according to a second embodiment.
Figure 6:
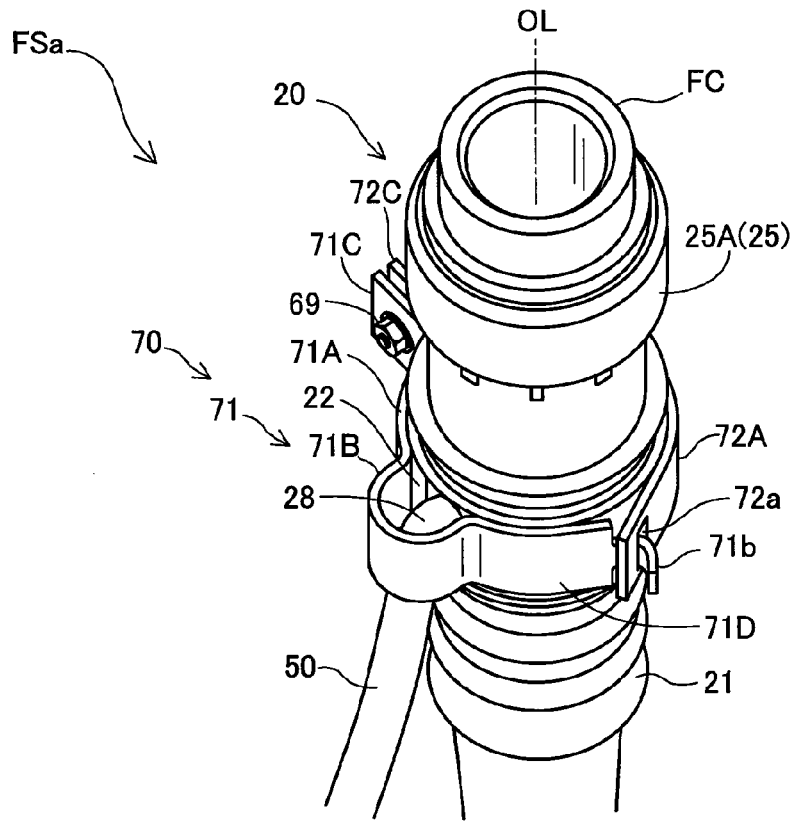
FIG. 6 is a diagram illustrating part of the fuel supply system according to the second embodiment.
Figure 7:
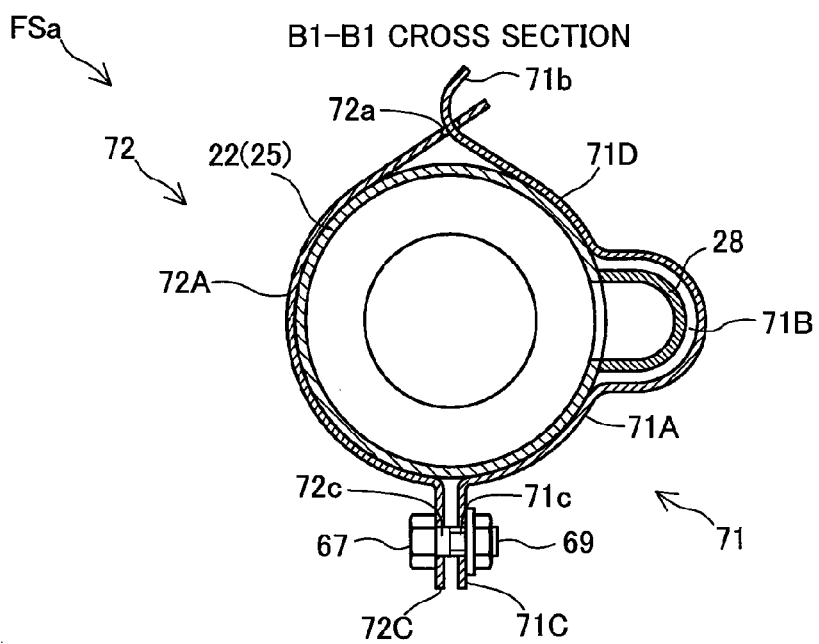
FIG. 7 is a diagram illustrating part of the fuel supply system according to the second embodiment.

FIGS. 5 to 7 are diagrams illustrating part of a fuel supply system FSa according to a second embodiment. More specifically, FIG. 5 is a side view illustrating the configuration in the periphery of a filler neck 20 in detail. FIG. 6 is a perspective view illustrating the configuration in the periphery of the filler neck 20 in detail. FIG. 7 is a sectional view illustrating the filler neck 20 taken on a line B1-B1 in FIG. 5. In the fuel supply system FSa of the second embodiment, a protective member 70 has a different configuration from that of the protective member 60 in the fuel supply system FS of the first embodiment. Otherwise the configuration of the fuel supply system FSa of the second embodiment is similar to that the fuel supply system FS of the first embodiment. The like elements of the second embodiment to those of the first embodiment are shown by the like signs. The following describes the protective member 70 in detail with omission of the description of the other components.

As shown in FIGS. 5 and 6, the protective member 70 includes a first protective element 71, a second protective element 72, a bolt 67 and a nut 69. Unlike the fuel supply system FS of the first embodiment, in the fuel supply system FSa of the second embodiment, the first protective structure 71 is placed to cover the joint of the filler neck body 25 with the breather port 28, while the second protective structure 72 is placed not to cover the joint of the filler neck body 25 with the breather port 28.

The first protective structure 71 includes a first large diameter portion 71A, a curved portion 71B continuous with the first large diameter portion 71A, a second large diameter portion 71D continuous with the curved portion 71B and a flat plate portion 71C continuous with the first large diameter portion 71A. The first large diameter portion 71A of the first protective structure 71 is placed along the groove 22 of the filler neck body 25 when the protective member 70 is fixed to the filler neck 20. The first large diameter portion 71A has a curved shape corresponding to the shape of the groove 22 of the filler neck body 25. The second large diameter portion 71D of the first protective structure 71 has the same diameter as that of the first large diameter portion 71A about the central axis OL and is placed along the groove 22 of the filler neck body 25 when the protective member 70 is fixed to the filler neck 20. The second large diameter portion 71D has a claw 71b that is formed at the other end of the second large diameter portion 71D opposite to one end continuous with the curved portion 71B to be inserted into a claw insertion hole 72a (described later) formed in the second protective structure 72. The claw 71b is formed in the second large diameter portion 71D to be placed at a position away from the groove 22 of the filler neck body 25. The second large diameter portion 71D is configured to have gradually decreasing distance from the groove 22 of the filler neck body 25 in a direction from the claw 71b toward the curved portion 71B about the central axis OL to be eventually engaged with the groove 22 of the filler neck body 25.

The curved portion 71B of the first protective structure 71 is placed away from the joint of the filler neck body 25 with the breather port 28 when the protective member 70 is fixed to the filler neck 20. The curved portion 71B has an arc-shaped surface of a diameter that is smaller than the diameter of the first large diameter portion 71A about an axis that is parallel to the central axis OL but is different from the central axis OL. Unlike the curved portion 61B of the first protective structure 61 of the first embodiment, the curved portion 71B is placed away from the entire joint of the filler neck body 25 with the breather port 28.

The arc of the second large diameter portion 71D about the central axis OL to be engaged with the groove 22 is smaller than the arc of the first large diameter portion 71A to be engaged with the groove 22.

Unlike the first large diameter portion 71A, the second large diameter portion 71D and the curved portion 71B, the flat plate portion 71C has a planar shape along the central axis OL. The flat plate portion 71C has a bolt insertion hole 71c which the bolt 67 passes through, in a center area of the flat plate portion 71C. The first protective structure 71 of the second embodiment corresponds to the first member of the claims, and the curved portion 71B of the second embodiment corresponds to the protective portion of the claims.

The second protective structure 72 includes a large diameter portion 72A and a flat plate portion 72C continuous with the large diameter portion 72A. The large diameter portion 72A of the second protective structure 72 is placed along the groove 22 of the filler neck body 25 when the protective member 70 is fixed to the filler neck 20. The large diameter portion 72A has a curved shape corresponding to the shape of the groove 22 of the filler neck body 25. The large diameter portion 72A has a curved surface about the central axis OL of the filler neck body 25 which has the same diameter as those of the first large diameter portion 71A and the second large diameter portion 71D of the first protective structure 71 but has the larger arc than the sum of the arc of the first large diameter portion 71A and the arc of the second large diameter portion 71D. The large diameter portion 72A has the claw insertion hole 72a formed at the other end of the large diameter portion 72A opposite to one end continuous with the flat plate portion 72C to receive the claw 71b of the first protective structure 71 inserted therein. The claw insertion hole 72a is formed in the large diameter portion 72A to be placed at a position away from the groove 22 of the filler neck body 25. The large diameter portion 72A is configured to have gradually decreasing distance from the groove 22 of the filler neck body 25 in a direction from the claw insertion hole 72a toward the flat plate portion 72C about the central axis OL to be eventually engaged with the groove 22 of the filler neck body 25.

The flat plate portion 72C has a planar shape that is plane symmetrical to the flat plate portion 71C with respect to the plane of the flat plate portion 71C of the first protective structure 71 when the protective member 70 is fixed to the filler neck body 25. Like the flat plate portion 71C of the first protective structure 71, the flat plate portion 72C has a bolt insertion hole 72c which the bolt 67 passes through, in a center area of the flat plate portion 72C. Accordingly, the flat plate portion 71C of the first protective structure 71 and the flat plate portion 72C of the second protective structure 72 have such shapes that are plane symmetrical to each other with respect to a plane going through the center of the joint of the breather port 28 with the filler neck body 25 and the central axis OL.

The claw 71b of the first protective structure 71 is inserted into the claw insertion hole 72a of the second protective structure 72, and the bolt 67 and the nut 69 are fastened in the bolt insertion hole 71c of the first protective structure 71 and the bolt insertion hole 72c of the second protective structure 72. The positions of the first protective structure 71 and the second protective structure 72 are then fixed relative to the groove 22 of the filler neck body 25.

As described above, in the fuel supply system FSa of the second embodiment, when the protective member 70 is fixed to the filler neck 20, the curved portion 71B of the first protective structure 71 covers the joint of the filler neck body 25 with the breather port 28. In the fuel supply system FSa of the second embodiment, the joint of the filler neck body 25 with the breather port 28 is accordingly covered by only the first protective structure 71. This configuration needs to change the material or the like of only the first protective structure 71 according to the specification of the automobile which the fuel supply system FSa is built in and the working condition of the automobile, thus improving the convenience of the fuel supply system FSa.

C. Third Embodiment

Figure 8:
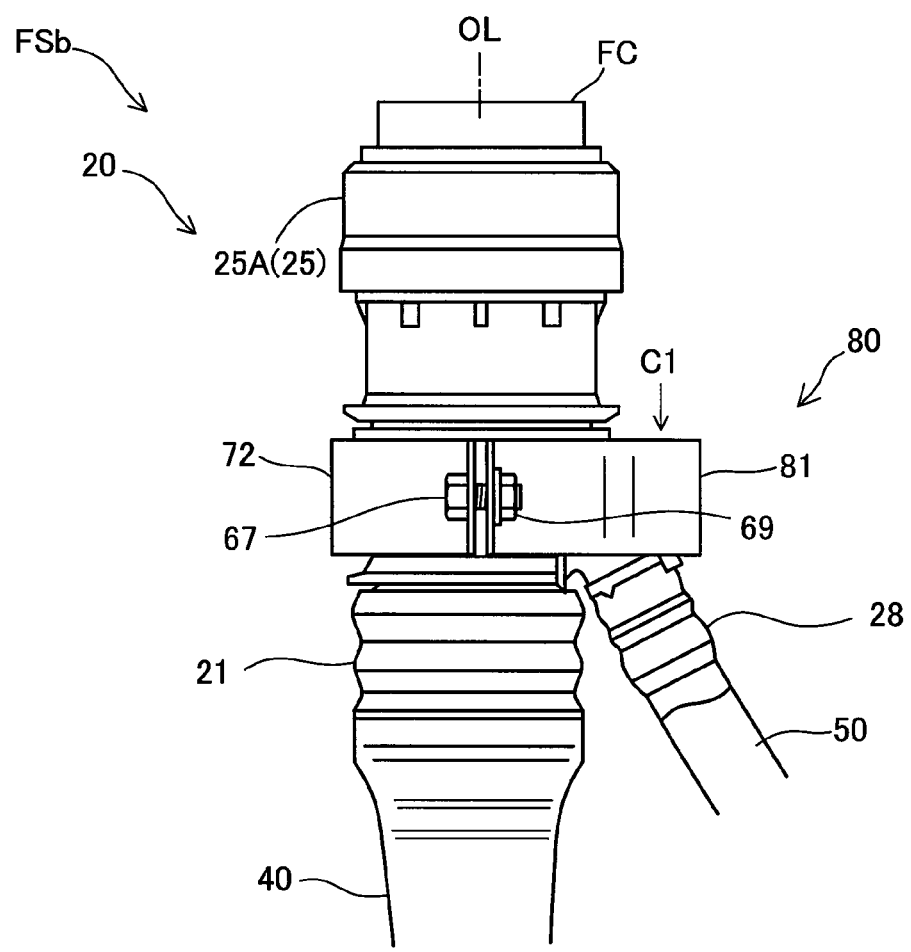
FIG. 8 is a diagram illustrating part of a fuel supply system according to a third embodiment.
Figure 9:
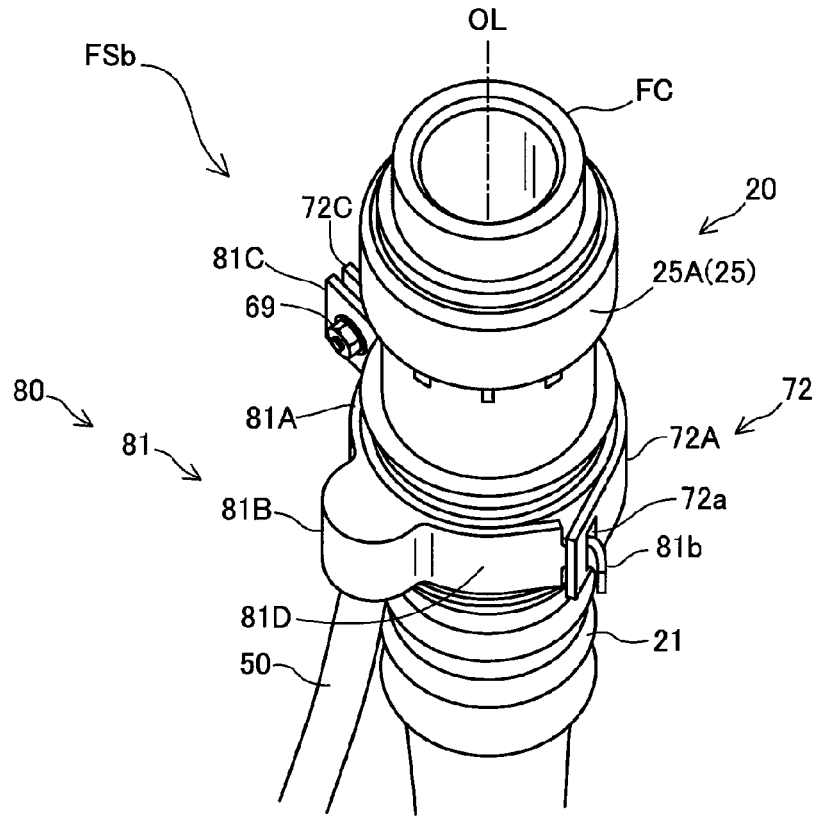
FIG. 9 is a diagram illustrating part of the fuel supply system according to the third embodiment.
Figure 10:
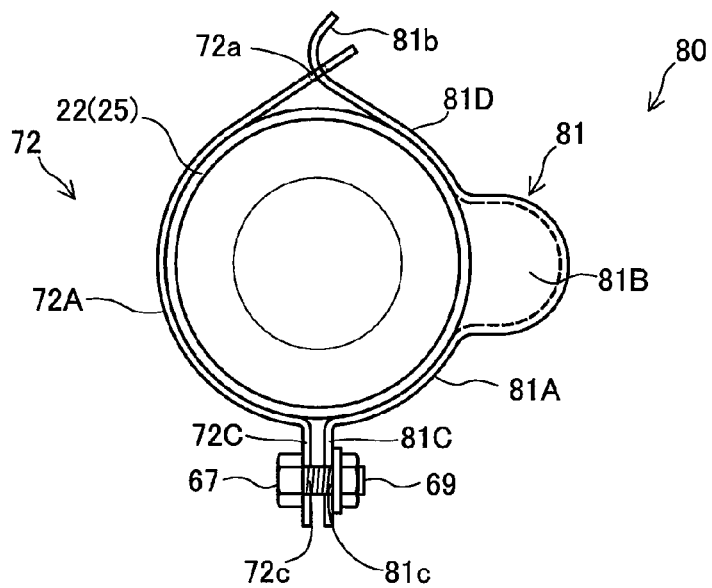
FIG. 10 is a diagram illustrating part of the fuel supply system according to the third embodiment.

FIGS. 8 to 10 are diagrams illustrating part of a fuel supply system FSb according to a third embodiment. More specifically, FIG. 8 is a side view illustrating the configuration in the periphery of a filler neck 20 in detail. FIG. 9 is a perspective view illustrating the configuration in the periphery of the filler neck 20 in detail. FIG. 10 is a diagram illustrating the filler neck 20 viewed from an arrow C1 in FIG. 8. In the fuel supply system FSb of the third embodiment, a first protective structure 81 of a protective member 80 has a different configuration from that of the first protective structure 71 in the fuel supply system FSa of the second embodiment. Otherwise the configuration of the fuel supply system FSb of the third embodiment is similar to that the fuel supply system FSa of the second embodiment. The like elements of the third embodiment to those of the second embodiment are shown by the like signs. The following describes the first protective structure 81 in detail with omission of the description of the other components.

As shown in FIGS. 8 and 9, the protective member 80 includes a first protective structure 82, a second protective structure 72, a bolt 67 and a nut 69. The fuel supply system FSb of the third embodiment differs from the fuel supply system FSa of the second embodiment by a curved portion 81B of the first protective structure 81 to cover the joint of the filler neck body 25 with the breather port 28.

The first protective structure 81 includes a first large diameter portion 81A, a curved portion 81B continuous with the first large diameter portion 81A, a second large diameter portion 81D continuous with the curved portion 81B and a flat plate portion 81C continuous with the first large diameter portion 81A. The first large diameter portion 81A, the second large diameter portion 81D and the flat plate portion 81C of the first protective structure 81 are respectively similar to the first large diameter portion 71A, the second large diameter portion 71D and the flat plate portion 71C of the first protective structure 71 of the second embodiment and are not specifically described. The curved portion 81B is placed away from the joint of the filler neck body 25 with the breather port 28 by a curved surface parallel to the central axis OL of the filler neck body 25 and a planar surface perpendicular to the central axis OL. In other words, the curved portion 81B has a shape defined by adding a cover for the surface perpendicular to the central axis OL to the curved portion 71B of the first protective structure 71 of the second embodiment. Accordingly, the curved portion 81B covers the joint of the filler neck body 25 with the breather port 28 on the filler port FC-side along the central axis OL of the filler neck body 25.

As described above, in the fuel supply system FSb of the third embodiment, the curved portion 81B of the first protective structure 81 additionally covers the joint of the filler neck body 25 with the breather port 28 on the filler port FC-side along the central axis OL. When an external impact force is applied along the central axis OL, this configuration reduces the impact force applied to the breather port 28.

D. Fourth Embodiment

Figure 11:
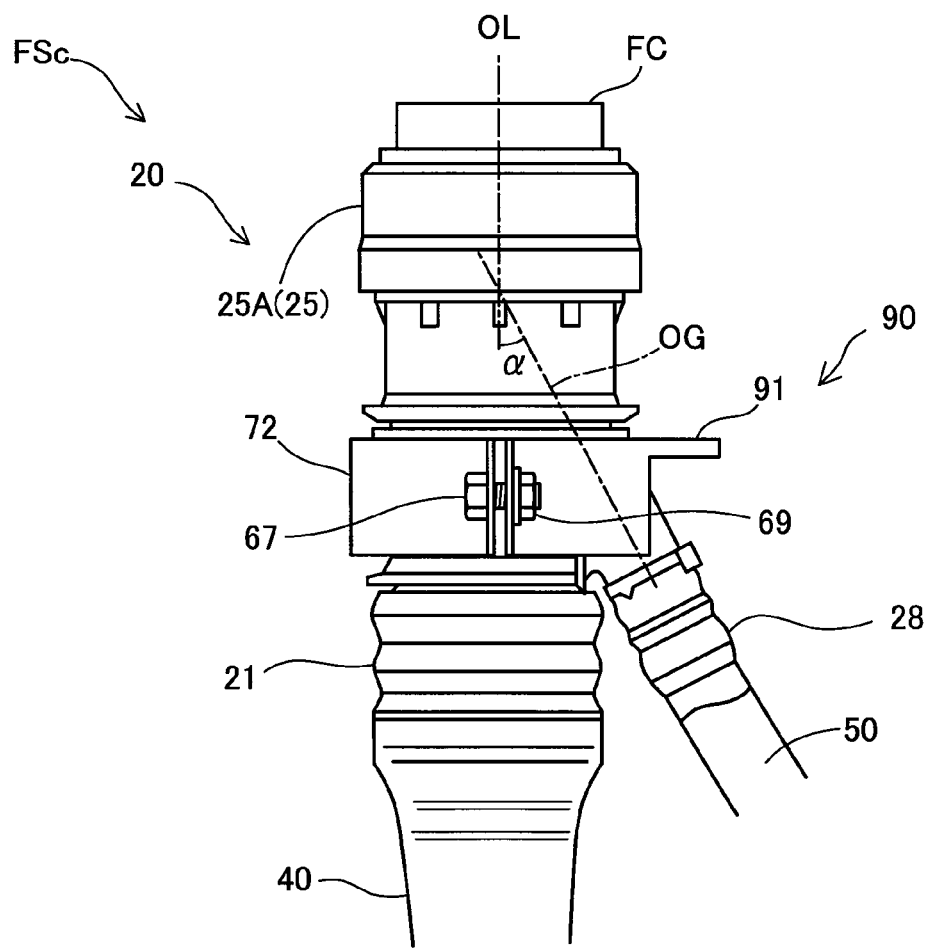
FIG. 11 is a diagram illustrating part of a fuel supply system according to a fourth embodiment.
Figure 12:
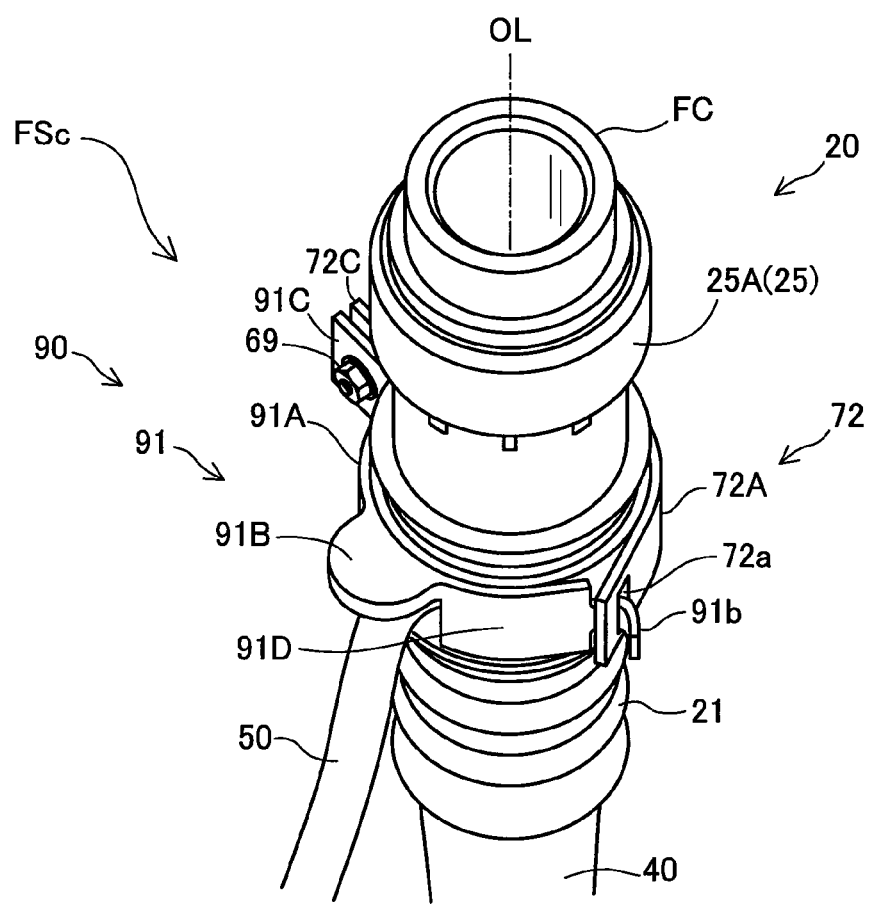
FIG. 12 is a diagram illustrating part of the fuel supply system according to the fourth embodiment.

FIGS. 11 and 12 are diagrams illustrating part of a fuel supply system FSc according to a fourth embodiment. More specifically, FIG. 11 is a side view illustrating the configuration in the periphery of a filler neck 20 in detail. FIG. 12 is a perspective view illustrating the configuration in the periphery of the filler neck 20 in detail. In the fuel supply system FSc of the fourth embodiment, a first protective structure 91 of a protective member 90 has a different configuration from that of the first protective structure 81 in the fuel supply system FSb of the third embodiment. Otherwise the configuration of the fuel supply system FSc of the fourth embodiment is similar to that the fuel supply system FSb of the third embodiment. The like elements of the fourth embodiment to those of the third embodiment are shown by the like signs. The following describes the first protective structure 91 in detail with omission of the description of the other components.

As shown in FIGS. 11 and 12, the protective member 90 includes a first protective structure 91, a second protective structure 72, a bolt 67 and a nut 69. The fuel supply system FSc of the fourth embodiment differs from the fuel supply system FSb of the third embodiment by a curved portion 91B of the first protective structure 91 to cover the joint of the filler neck body 25 with the breather port 28. A central axis OG of the breather port 28 is shown in FIG. 11, in addition to the central axis OL of the filler neck body 25. The central axis OG of the breather port 28 is at an angle α to the central axis OL of the filler neck body 25.

The first protective structure 91 includes a first large diameter portion 91A, a curved portion 91B continuous with the first large diameter portion 91A, a second large diameter portion 91D continuous with the curved portion 91B and a flat plate portion 91C continuous with the first large diameter portion 91A. The first large diameter portion 91A, the second large diameter portion 91D and the flat plate portion 91C of the first protective structure 91 are respectively similar to the first large diameter portion 81A, the second large diameter portion 81D and the flat plate portion 81C of the first protective structure 81 of the third embodiment and are not specifically described. The curved portion 91B covers the joint of the filler neck body 25 with the breather port 28 by a planar surface perpendicular to the central axis OL of the filler neck body 25 but does not cover the joint of the filler neck body 25 with the breather port 28 by a curved surface parallel to the central axis OL. In other words, the curved portion 91B has such a shape that only the cover for the surface perpendicular to the central axis OL is left in the shape of the curved portion 81B of the first protective structure 81 of the third embodiment.

E. Fifth Embodiment

Figure 13:
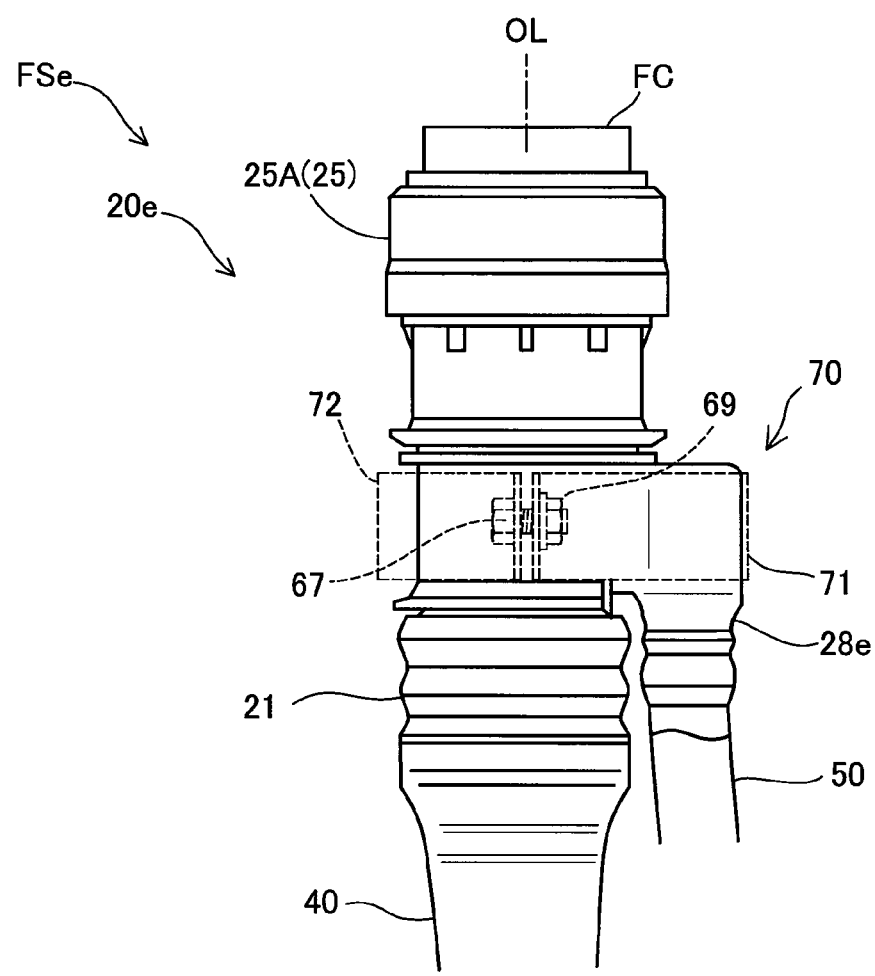
FIG. 13 is a diagram illustrating part of a fuel supply system according to a fifth embodiment.

FIG. 13 is a diagram illustrating part of a fuel supply system FSe according to a fifth embodiment. More specifically, FIG. 13 is a side view illustrating the configuration in the periphery of a filler neck 20e of the fifth embodiment in detail. The fuel supply system FSe of the fifth embodiment differs from the fuel supply system FSa of the second embodiment by a breather port 28e of a filler neck 20e that has a different configuration from that of the breather port 28 of the second embodiment. Otherwise the configuration of the fuel supply system FSe of the fifth embodiment including a protective member 70 is similar to that the fuel supply system FSa of the second embodiment. The like elements of the fifth embodiment to those of the second embodiment are shown by the like signs. The following describes the configuration of the breather port 28e in detail with omission of the description of the other components. In order to clarify the configuration of the breather port 28e branched off from the filler neck body 25, the filler neck 20e that is actually hidden by the protective member 70 is explicitly illustrated, and the outline of the protective member 70 is shown by the broken line in FIG. 13.

As shown in FIG. 13, a base end side of the breather port 28e of the fifth embodiment is branched off from the filler neck body 25 at a right angle to the central axis OL of the filler neck body 25, instead of the acute angle in the breather port 28 of the second embodiment. The breather port 28e is formed from the base end side to the opposite end side to be parallel to the central axis OL. Like this embodiment, the breather port 28 branched off from the filler neck body 25 and protected by the protective member 70 may have any of various configurations.

F. Sixth Embodiment

Figure 14:
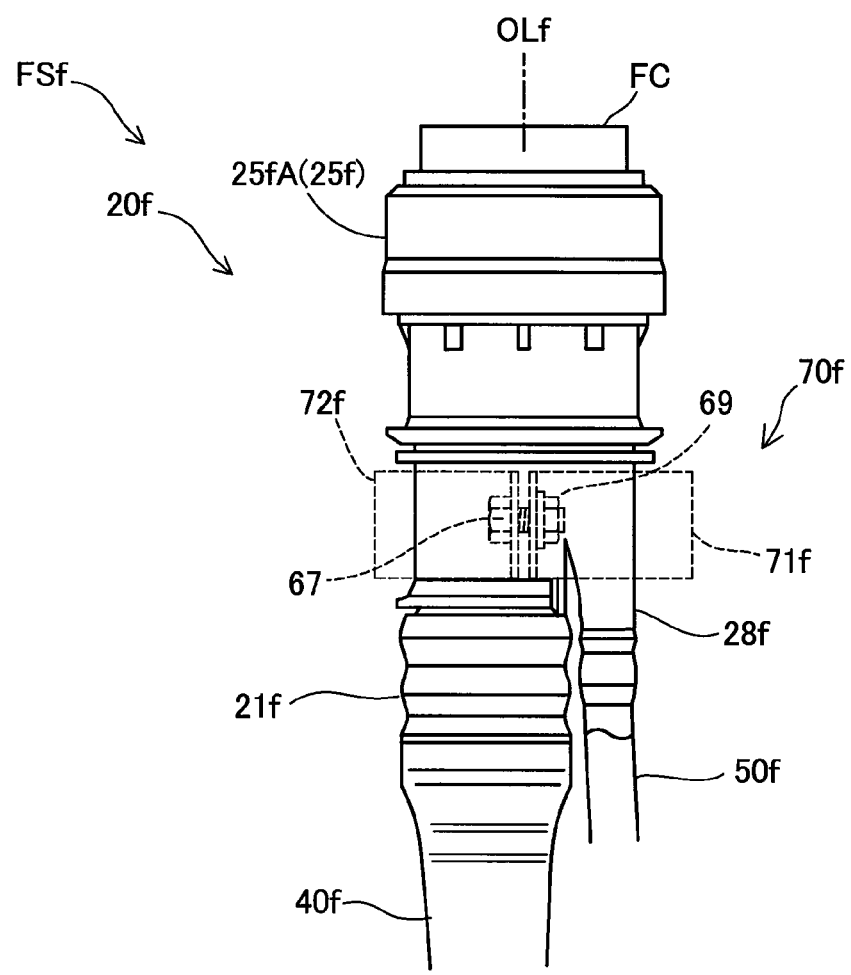
FIG. 14 is a diagram illustrating part of a fuel supply system according to a sixth embodiment.

FIG. 14 is a diagram illustrating part of a fuel supply system FSf according to a sixth embodiment. More specifically, FIG. 4 is a side view illustrating the configuration in the periphery of a filler neck 20f of the sixth embodiment in detail. The fuel supply system FSf of the sixth embodiment differs from the fuel supply system FSa of the second embodiment by the configurations of a filler neck body 25f, a breather port 28f and a protective member 70f. In order to clarify the configurations of the filler neck body 25f and the breather port 28f, the filler neck 20f that is actually hidden by the protective member 70f is explicitly illustrated, and the outline of the protective member 70f is shown by the broken line in FIG. 14.

As shown in FIG. 14, in the filler neck 20f of the sixth embodiment, the breather port 28f branched off from the filler neck body 25f has a configuration that is not protruded in the radial direction. In other words, a tube connection structure 21f of the filler neck body 25f and the breather port 28f are placed on the inner side of a large diameter portion 25fA of the filler neck body 25f. A curved portion 71fB of a first protective structure 71f included in the protective member 70f is formed to have a smaller diameter according to the configuration of the breather port 28f that is not protruded in the radial direction from the filler neck body 25f. According to another embodiment, the curved portion 71fB of the first protective structure 71f of the sixth embodiment may be omitted, and the protective member 70 may be formed in a circular shape about the central axis OL in planar view. As shown in FIG. 14, according to the sixth embodiment, a filler tube 40f connected with the tube connection structure 21f has a smaller diameter than that of the filler tube 40 of the second embodiment, and a breather pipe 50f connected with the breather port 28f has a smaller diameter than that of the breather pipe 50 of the second embodiment. Like this embodiment, the breather port 28 branched off from the filler neck body 25 to be or not to be protruded in the radial direction may have any of various dimensions and any of various configurations.

G. Modifications

G1. Modification 1

Figure 15:
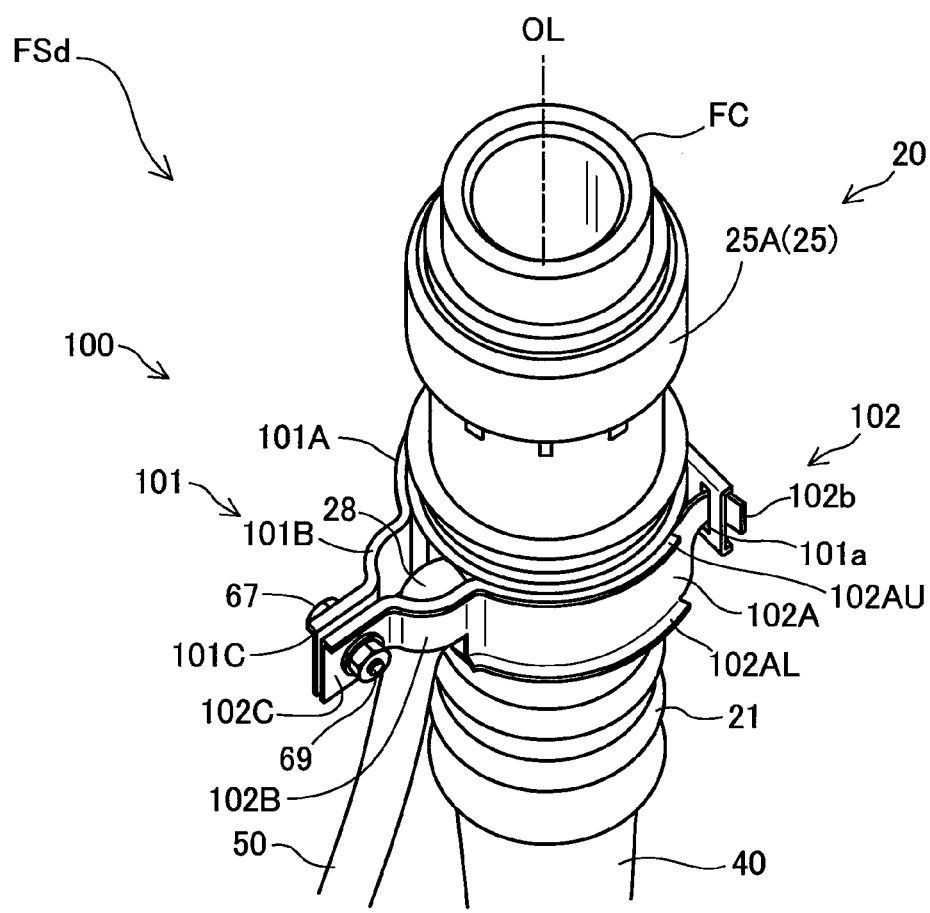
FIG. 15 is a perspective view illustrating the detailed configuration in the periphery of a filler neck in a fuel supply system according to a modification.

In the above embodiment, the first protective structure 61 and the second protective structure 62 constituting part of the protective member 60 are formed to have the curved surfaces parallel to the central axis OL of the filler neck body 25. The configurations of the respective components constituting the protective member 60 are, however, not limited to this embodiment but may be modified in various ways. FIG. 15 is a perspective view illustrating the detailed configuration in the periphery of a filler neck 20 in a fuel supply system FSd according to a modification. The fuel supply system FSd of the modification differs from the fuel supply system FS of the first embodiment by the configurations of a first protective structure 101 and a second protective structure 102 included in a protective member 100. Otherwise the configuration of the fuel supply system FSd of the modification is similar to that the fuel supply system FS of the first embodiment. As shown in FIG. 15, respective ends of the first protective structure 101 and the second protective structure 102 along the central axis OL are partly folded and bent at an angle of 90 degrees, in order to enhance the strength of the first protective structure 101 and the second protective structure 102. For example, an upper bent section 102AU included in a large diameter portion 102A of the second protective structure 102 and formed on a filler port FC-side end along the central axis OL is folded and bent perpendicularly to the central axis OL. Similarly, a lower bent section 102AL included in the large diameter portion 102A and formed on an opposite side end opposite to the filler port FC-side end along the central axis OL is folded and bent perpendicularly to the central axis OL.

G2. Modification 2

In the above embodiment, the first protective structure 61 and the second protective structure 62 constituting part of the protective member 60 are made of the metal material. The material of the first protective structure 61 and the second protective structure 62 is, however, not limited to the metal but may be a resin. A hard resin is especially preferable for the material of the first protective structure 61 and the second protective structure 62. The filler tube 40 is the resin tube in the above embodiment, but may be a metal tube.

In the fuel supply system FSb of the third embodiment described above, the curved portion 81B of the first protective structure 81 is configured to cover the joint of the filler neck body 25 with the breather port 28 by the surface perpendicular to the central axis OL of the filler neck body 25 on the filler port FC-side along the central axis OL (hereinafter simply referred to as "upper surface"). The surface configured to cover the breather port 28 is, however, not limited to this embodiment but may be modified in various ways. For example, the joint of the filler neck body 25 with the breather port 28 may additionally be covered by a surface perpendicular to the central axis OL on an opposite side opposite to the filler port FC-side along the central axis OL (hereinafter simply referred to as "lower surface") in a range that does not interfere with the breather pipe 50 connected with the breather port 28. The curved portion 81B may cover the joint of the filler neck body 25 with the breather port 28 only by the lower surface, in place of the upper surface. The upper surface or the lower surface may not be necessarily a surface perpendicular to the central axis OL but may be a surface formed along the side face of the breather port 28 or the side face of the breather pipe 50 connected with the breather port 28. Such modification with respect to the upper surface or the lower surface may be applied to the first protective structure 91 in the fuel supply system FSc of the fourth embodiment.

According to the above embodiment, the groove 22 formed in the filler neck body 25 serves as the fixation structure to fix the protective member 60 to the filler neck body 25. The fixation structure formed in the filler neck 20 is, however, not limited to this embodiment but may be modified in various ways. According to one modification, projections may be formed in the filler neck body 25, and holes may be formed in the first protective structure 61 and the second protective structure 62 to receive the projections of the filler neck body 25 inserted therein. The protective member 60 may be fixed to the filler neck body 25 by insertion of the projections of the filler neck body 25 in the holes of the first protective structure 61 and the second protective structure 62. In this modification, the first protective structure 61 and the second protective structure 62 are not engaged with the groove 22 of the filler neck body 25, so that there is no need that the first protective structure 61 and the second protective structure 62 are formed to surround the outer circumference of the filler neck body 25. According to another modification, bolt insertion holes may be formed in the filler neck body 25 at positions corresponding to the bolt insertion hole 61c formed in the flat plate portion 61C of the first protective structure 61 and the bolt insertion hole 62c formed in the flat plate portion 62C of the second protective structure 62. In this modification, the position of the filler neck body 25 as well as the positions of the first protective structure 61 and the second protective structure 62 are fixed by fastening the bolt 67 and the nut 69.

G3. Modification 3

In the above embodiments, the joint of the breather port 28 is covered by the surface parallel to or perpendicular to the central axis OL of the filler neck body 25. The configuration for covering the joint of the breather port 28 is, however, not limited to these embodiments but may be modified in various ways. According to one modification of the fourth embodiment, the curved portion 91B of the first protective structure 91 may be formed as a curved surface parallel to the central axis OG to cover the joint of the breather port 28. In this modification, the curved portion 91B of the first protective structure 91 is placed entirely at a position away from the outer circumference of the breather port 28 by a fixed distance. Even when an external impact force is applied to the curved portion 91B, this configuration prevents the impact force from being concentrated at part of the breather port 28. This more effectively protects the breather port 28 from damage. The joint of the breather port 28 may be covered by any combination of a plurality of surfaces, i.e., the curved surface parallel to the central axis OG, the curved surface parallel to the central axis OL and the planar surface perpendicular to the central axis OL.

In the above embodiments, the joint of the breather port 28 is covered by the curved surface, for example, by the curved surfaces of the curved portion 61B of the first protective structure 61 and the curved portion 62B of the second protective structure 62 of the first embodiment. The configurations of the curved portions 61B and 62B are, however, not limited to the curved surfaces but may be modified in various ways. For example, the curved portion 61B and the flat plate portion 61C may be formed in a rectangular shape, instead of the circular shape, when viewed from the filler port FC-side along the central axis OL. In another example, the curved portion 61B and the curved portion 62B may be tapered along the central axis OG of the breather port 28.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A fuel supply system, comprising:
a filler neck that has (i) a filler neck body with a tubular shape and (ii) a pipe connection structure which is a breather port formed in the filler neck body, the breather port is configured to connect to a breather pipe, the breather port is branched from the filler neck body;
a protective member that is configured to cover the filler neck and the breather port at a location that the breather port branches from the filler neck body, the protective member comprises a first member and a second member, wherein
the first member is formed separately from the filler neck; and
the second member is formed separately from the filler neck to be different from the first member, and the first member and the second member are engaged with each other, wherein
at least one of the first member and the second member includes a protective portion that is configured to cover at least part of the breather port in a state that the first member and the second member are engaged with each other and positions of the first member and the second member to the filler neck are fixed.

2. The fuel supply system according to claim 1,
wherein the filler neck has a fixation structure that fixes at least one of the positions of the first member and the second member to the filler neck.

3. The fuel supply system according to claim 2,
wherein the protective portion includes a first protective portion included in the first member and a second protective portion included in the second member, and
in the state that the first member and the second member are engaged with each other and the positions of the first member and the second member to the filler neck are fixed, the first protective portion and the second protective portion are configured to cover the breather port as curved surfaces parallel to a central axis of the filler neck body formed in the tubular shape, and the respective curved surfaces parallel to the central axis of the filler neck body to cover the breather port do not overlap with each other.

4. The fuel supply system according to claim 3,
wherein in the state that the first member and the second member are engaged with each other and the positions of the first member and the second member to the filler neck are fixed, the first member and the second member are configured to cover the breather port as the curved surfaces parallel to the central axis of the filler neck body and cover the breather port on a side of the filler neck receiving a supplied fuel along the central axis of the filler neck body.

5. The fuel supply system according to claim 2,
wherein in the state that the first member and the second member are engaged with each other and the positions of the first member and the second member to the filler neck are fixed, the first member is formed to cover the breather port as a curved surface parallel to a central axis of the filler neck body formed in the tubular shape.

6. The fuel supply system according to claim 5,
wherein in the state that the first member and the second member are engaged with each other and the positions of the first member and the second member to the filler neck are fixed, the first member and the second member are configured to cover the breather port as the curved surfaces parallel to the central axis of the filler neck body and cover the breather port on a side of the filler neck receiving a supplied fuel along the central axis of the filler neck body.

7. The fuel supply system according to claim 1,
wherein the protective portion includes a first protective portion included in the first member and a second protective portion included in the second member, and
in the state that the first member and the second member are engaged with each other and the positions of the first member and the second member to the filler neck are fixed, the first protective portion and the second protective portion are configured to cover the breather port as curved surfaces parallel to a central axis of the filler neck body formed in the tubular shape, such that the respective curved surfaces parallel to the central axis of the filler neck body to cover the breather port do not overlap with each other.

8. The fuel supply system according to claim 7,
wherein in the state that the first member and the second member are engaged with each other and the positions of the first member and the second member to the filler neck are fixed, the first member and the second member are configured to cover the breather port as the curved surfaces parallel to the central axis of the filler neck body and cover the breather port on a side of the filler neck receiving a supplied fuel along the central axis of the filler neck body.

9. The fuel supply system according to claim 8,
wherein the protective portion is configured to cover the breather port as a curved surface parallel to a central axis of the breather port.

10. The fuel supply system according to claim 1,
wherein in the state that the first member and the second member are engaged with each other and the positions of the first member and the second member are fixed relative to the filler neck, the first member is formed to cover the breather port as a curved surface parallel to a central axis of the filler neck body formed in the tubular shape.

11. The fuel supply system according to claim 10,
wherein in the state that the first member and the second member are engaged with each other and the positions of the first member and the second member to the filler neck are fixed, the first member and the second member are configured to cover the breather port as the curved surfaces parallel to the central axis of the filler neck body and cover the breather port on a side of the filler neck receiving a supplied fuel along the central axis of the filler neck body.

12. The fuel supply system according to claim 11,
wherein the protective portion is configured to cover the breather port as a curved surface parallel to a central axis of the breather port.

13. The fuel supply system according to claim 1,
wherein the protective portion is configured to cover the breather port as a curved surface parallel to a central axis of the breather port.

14. The fuel supply system according to claim 1, wherein the breather port is hollow cylindrical member branched from the filler neck body, and the breather port is formed to have a smaller diameter than a diameter of the filler neck body.

15. The fuel supply system according to claim 1, wherein the protective member is fixed at a position of the filler neck body to which the breather port is connected, the first member and the second member are located at positions away from a joint of the filler neck body with the breather port, and
the first member and the second member cover the joint of the filler neck body with the breather port.

16. The fuel supply system according to claim 15, wherein the filler neck body has a groove formed along an outer circumference of the filler neck body, and
the first member of the protective member includes a large diameter portion fastened in the groove of the filler neck body.

17. The fuel supply system according to claim 1,
wherein in the state that the first member and the second member are engaged with each other and the positions of the first member and the second member to the filler neck are fixed, the first member is formed to cover the breather port as a curved surface parallel to a central axis of the filler neck body formed in the tubular shape, and
a first large diameter portion of the first member and a second large diameter portion of the second member are placed along a groove formed along an outer circumference of the filler neck body.

* * * * *